Dec. 8, 1959                W. M. THOMAS ET AL                2,915,940
                            OPTICAL ALIGNMENT GAGE
Filed Dec. 31, 1957                                          2 Sheets-Sheet 1
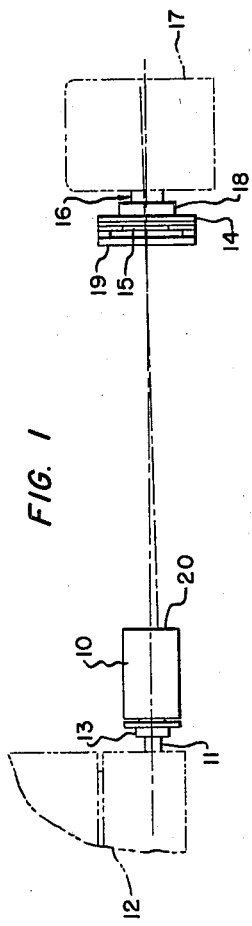
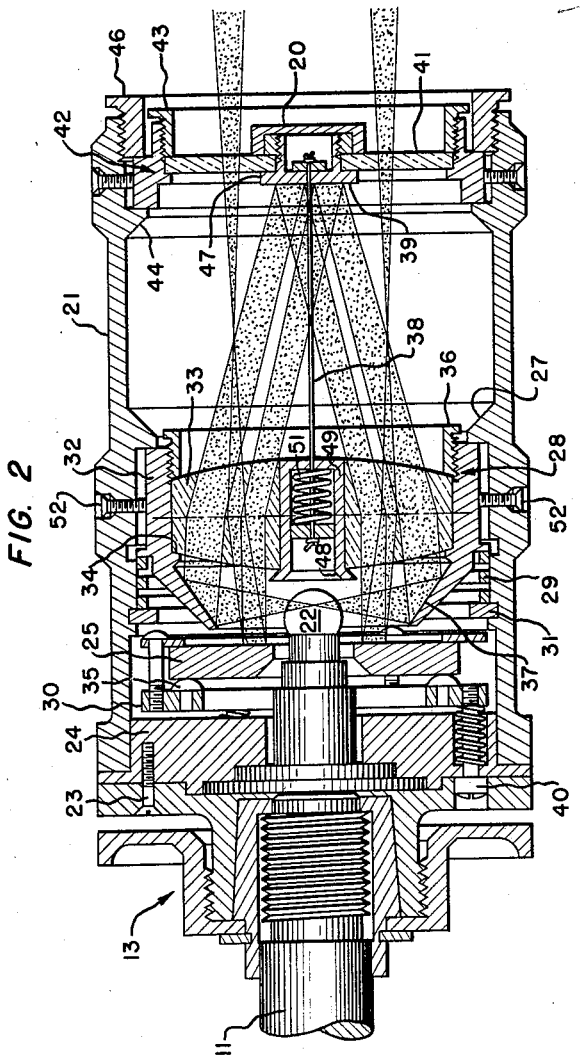
INVENTORS
WILLIAM M. THOMAS
NEIL D. TRACY
BY
ATTORNEY Dec. 8, 1959   W. M. THOMAS ET AL   2,915,940
OPTICAL ALIGNMENT GAGE
Filed Dec. 31, 1957   2 Sheets-Sheet 2
FIG. 4
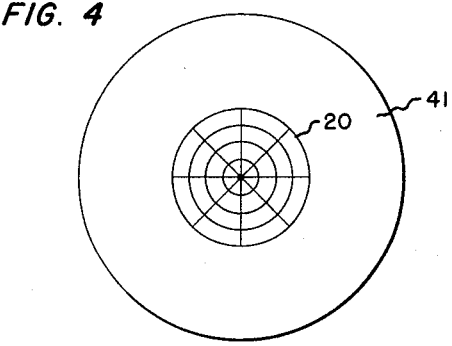
FIG. 3
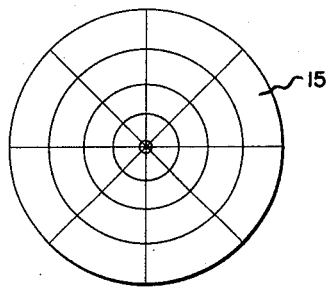
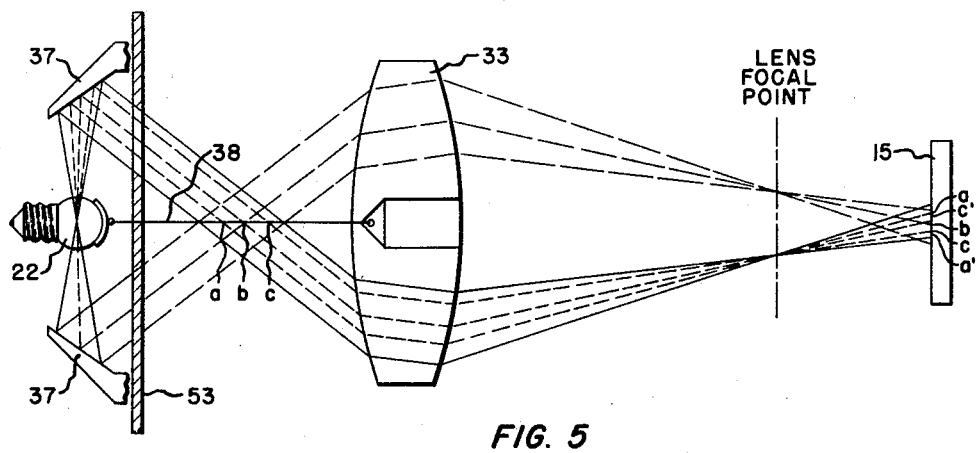
FIG. 5
FIG. 6
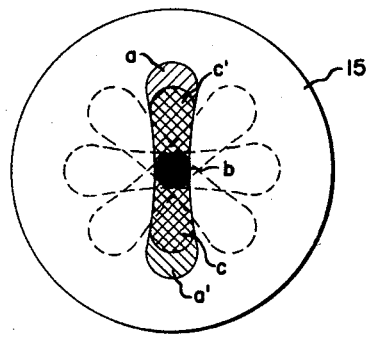
INVENTORS
WILLIAM M. THOMAS
NEIL D. TRACY
BY
ATTORNEY

United States Patent Office 2,915,940
Patented Dec. 8, 1959

2,915,940

OPTICAL ALIGNMENT GAGE

William M. Thomas, El Cajon, and Neil D. Tracy, Chula Vista, Calif., assignors to General Dynamics Corporation, San Diego, Calif., a corporation of Delaware Application December 31, 1957, Serial No. 706,324

7 Claims. (Cl. 88—14)

This invention relates to projection type optical alignment gages and more particularly to optical alignment gages for checking the alignment of mechanical units which are physically separated.

In checking the relative positions of shafts separated by space, mechanical and optical measuring systems are used. In one system the shafts are extended and joined with a universal joint type coupling. A dial indicator operating on surfaces normal to each of the shafts is used. Several readings are made on each shaft, logged on a sheet and graphs are plotted for comparison with standard data which sets forth permissive tolerance parameters. This is not a desirable system because of the obvious delays and time consumed between each adjustment before it can be determined whether further adjustment is necessary. It also requires skilled technicians who are not always available for field installation and servicing.

In optical systems a telescope with an offset eyepiece is used so that the operator's line of sight is projected along the axis of the shaft onto a target on the face of the second shaft to check for axial misalignment of the second shaft relative to the first shaft. A mirror is then placed on the target to auto-collimate the reticle back into the telescope to check the angular misalignment of the second shaft. Accuracy is obtained in determining axial misalignment by using an optical micrometer to measure the axial offset of the second shaft. However, an optical micrometer will not work in the auto-collimation step as it has no effect in collimating. Hence, a different instrument must be used to perform this function or a very complex reticle must be used to define all the possible positions which are basic to axial and angular alignment. Telescopes require focusing in which adjustment is made for distance and the operator's eye. The focusing knob provides entrance to the interior for dirt. Moreover, any error in reticle alignment due to necessary clearance tolerances in the telescope shows up as magnified error in the target reading. Redesign of most telescopic optical tooling instruments now available would be necessary to make offset systems of them to permit axial observation by the operator. Another serious limitation is that these instruments cannot be used where available space is quite limited. Most existing optical projection systems project their light beam through the center of the lens in projecting an image onto a target from the second shaft, and thus lack a central area for the placement of a target on the face of the projector for measuring the relative angular alignment of the two shafts. Therefore, in modifying these systems for use in obtaining angular alignment it would be necessary to use an angled mirror on the target area of the second shaft to reflect the image back onto an offset target adjacent the projector to check for angular alignment. In addition to complexity of fabrication and operation, problems of parallax are inherent in this type of system.

The optical alignment gage comprising the present invention consists of a projector fitted over the face of the first shaft and a target on the face of the second shaft. The projector provides for a converging ring of light (generated from a low intensity light source) with a reticle passing longitudinally through the apex of the cone thus formed. The reticle in the preferred embodiment is also in axial alignment with the axis of the first shaft. A system of lenses and reflectors project the reticle onto the target as a sharp shadow dot with a light surround. This dot represents the extended axis of the first shaft. An attachable mirror may be placed over the target to reflect the shadow dot back to a second target on the face of the projector to show the angular relationship between the axis of the second shaft and the axis of the first shaft.

It is therefore an object of this invention to provide for an improved optical alignment gage.

Another object is the provision of an optical alignment gage having a reticle whose axis is in axial alignment with the optical axis of the projector system and wherein a system of lens and reflecting surfaces projects the reticle onto a target as a shadow dot.

Another object is the provision of an optical alignment gage wherein an optical ring of light is projected from around the center of the projector face to permit mounting of a target on its face over the optical axis of the projector.

Another object is the provision of an optical alignment gage wherein the dot representing the extension of the axis of the first mechanical unit is always in focus regardless of the distance to the target.

Another object is the provision of an optical alignment gage in which heat problems are eliminated by use of a low intensity light source.

Another object is the provision of an optical alignment gage which will determine the axial alignment, the collimation, the angular displacement, and the angular relationship of two separated shafts.

Another object is the provision of an optical alignment gage which has flexibility in use, which is simple in construction and operation, which is insensitive to shock and vibration, and which is compact to permit use in crowded and heretofore inaccessible areas.

Figure 1 illustrates the relative positions of a first and second mechanical unit with the projector unit and target positioned for use.

Figure 2 is a cross-sectional view of the projector unit with illustrated light projections to explain its operation.

Figure 3 shows the target surface which receives the light projection from the projector.

Figure 4 shows a second target which receives the reflected image projected from the first target.

Fig. 5 is a schematic illustration to show how the axial reticle is projected as a dot shadow when light through a narrow slotted shield passes to the target.

Figure 6 shows an elongated slit which represents the shadow on the target from a single plane of light.

Referring now to the drawings wherein like numerals represent like parts throughout the several views, a projector 10 is fastened to the shaft 11 of a driving unit 12 in Figure 1 by means of a universal mounting device 13 which is operable to secure the projector in axial alignment on any size of shaft. This mounting device is one of many types readily available and its further description and function is not thought to be necessary. A target 14 having a face 15 such as shown in Figure 3 is mounted on a shaft 16 of a driven unit 17 which in this example is desired to be checked for alignment with the shaft 11 of the driving unit 12. The target mounting device 18 is adapted for any size shaft and maintains the target face 15 in a plane normal to the axis of the shaft 16. The projector 10 projects a shadow dot with a light surround onto face 15 of the target 14 and the second shaft 16 can be then moved until the dot is centered. When this is done the face of the second shaft 16 is in alignment with the extended axis of the first shaft 11. However, this does not show that the axis of the second shaft 16 is in alignment with the axis of the first shaft 11. To do this a target mirror 19 must be provided. This mirror is preferably attached magnetically for easy installation and removal. The mirror projects the shadow dot image back to the projector to a second target 20 on the face thereof. A partial rotation of the shaft to which the mirror has been attached will determine whether the mirror surface is in the plane normal to the shaft axis. This is done by observing whether the dot moves on a second target during rotation. After the mirror 19 has been attached to reflect the dot to the second target 20, the angular alignment of the second shaft 16 with the axis of the first shaft 11 can then be effected by manipulating either shaft until the dot is zeroed or centered on the second target. The degree of the angle from the center of the projector to the first target and back to the second target represents twice the angle of error or angle of misalignment of the second shaft with the first shaft. While the use of the projector 10 and target 14 is shown in Figure 1 for purposes of aligning two shafts, it should be noted that collimation, desired angular displacement, the correct angular relationship between the two shafts can also be effected with this device.

Referring now to Figure 2 there is shown a housing 21 which fits over the end of the mounting device 13, in this instance a collet of conventional design. A low intensity light source 22 is fitted in alignment with the axial center of the mounting device 13, and thus the axial center of the shaft 11. Easy access can be made to the light source, for changing bulbs or for other reasons, by removing the screws 23 which secure the housing 21 to the mounting device 13 and then withdrawing the light source from the counterbored hole in the center of plate 24. An annular reflector 25 is mounted around light source 22 and abuts three pads 35 on tilt adjustable support 30. This support is spring urged outwardly from plate 24 and is angularly adjustable by means of adjusting screw 40 to provide for proper alignment in the assembly of this device. An annular projection 27 on the inner surface of the housing 21 serves as a stop against which reflector and lens mounting 28 is urged by compression spring 29. A snap ring 31 fits into a groove on the housing inner surface to complete the lens mounting assembly. The reflector and lens mounting 28 comprises an outer ring 32, into which the lens 33 is inserted and positioned against an inner annular projection 34 therein, a securing ring 36 which prevents displacement of the lens, and an inwardly converging reflecting ring 37. The cross-sectional surface of this ring may be straight or curved as dictated by the type of lens used. This reflecting surface and lens combination must reflect the outwardly directed light rays in a converging manner onto the reticle or filament 38 and reflecting surface 39 at such an angle that it will then be reflected onto reflector 25 and out the glass window 41 in the front of the housing in a converging manner. The glass window 41 is secured in its window mounting 42 with another securing ring 43. This mounting 42, in turn, is positioned against another inner annular projection 44 with another securing ring 46. The window 41 has means 47 in the center for holding one end of the reticle 38 and has target 20 on its outer surface and a reflecting inner surface 39. A combination shield 48 and reticle holder 49 is mounted in the center of the lens 33. The reticle 38 is held taut between the two reticle holders 47, 49 by a compression spring 51. This spring maintains the reticle in a taut position while allowing for expansion and contraction of the reticle with change in humidity, temperature, and other climatic conditions. The outer diameters of the window mounting 42 and outer ring 32 are somewhat less than the inner diameter of housing 21. Adjusting screws 52 extend inwardly to engage the mounting 42 and ring 32 to position them in planes normal to the reticle 38 so that the reticle may be aligned with the axis of the projector 10, and hence the axis of any shaft upon which it is mounted. After assembly and adjustment, the adjustment screws 52 are sealed off to prevent entrance of dirt or moisture. The adjustment is made during assembly and no further adjustment is necessary during operational use of the projector. While reflecting surfaces 37 and 39 and reflector 25 are generally shown to be flat in cross section, it should be noted that the focal length of the lens used will determine their amount of curvature, it being necessary that a converging cone of light be generated which will converge on reflector surface 39 with the reticle 38 passing through the apex of the cone to cast a shadow, and that the shadow and light cone be reflected back upon reflector 25 and out through the cover glass window 41 in a converging manner to be projected upon target face 15, shown in Figure 3. One of the two shafts 11 or 16 is then moved until the shadow dot appears within one of the circles on the face in Figure 3 selected as the maximum tolerance in shaft alignment. After this is done the mirror 19 is then positioned over the target 14 to reflect the shadow dot back to the second target 20 on the face of the projector 10. This target is shown in Figure 4. The position of the dot on this target represents the angular misalignment of the shafts and adjustment is made to bring the shadow dot within the circle previously selected as the maximum tolerance permitted in a particular application.

Figure 5 illustrates the operation of the optical system. Here a shield 53 is used to block out all light from the converging conical ring source except a narrow slot or beam of light at the top. If this slot is the thickness of the reticle or filament 38, the reticle then casts a shadow on the target face 15. However, since no other light can be projected to the target because of the shield, this verticle shadow cannot be seen. When the slot is widened a small amount, the shadow can then be seen. As the shield is rotated, the elongated shadow will also rotate to illustrate that for each angle of rotation there are two superimposed lines of shadow. These lines are actually reversed 180° and substantially overlap, although the ends of one line may extend longer or be shorter than the ends of the other, depending upon the distance of the target from the projector. The lines, shown in Figure 6, represent projections of points a, b, and c of the reticle in Figure 5. Assume that target 15 is spaced from the projector 10 such that point b is in focus on the target whereas point a, projected over a longer path, and point c, projected over a shorter path, are out of focus and therefore appear fuzzy and blurred. When light in a vertical column only is projected, points b in both vertical shadows are in focus, sharp and clearly defined whereas points a, c on one shadow line, and overlapping points c', a' on the other line are fuzzy and blurred, since they are not in focus. When no shield is used, a plurality of radial intersecting lines are projected onto the target. However, since light rays from all portions of the conical beam are also converged upon the target, the non-intersecting portions of all the line shadows are erased, leaving only the intersecting portions of the lines to form a shadow dot with the rest of the target lighted by the conical beam.

If the target is spaced closer to or farther from the projector such that point a or c on reticle 38 is projected in focus on the target, the focusing action and magnification of the lens provides for a small change in the size of the shadow dot although the dot is in focus for any spacing distance. However, this change is not enough to be considered an impairment to the accuracy of the device.

From the foregoing it is noted that provision is made for an accurate and fast alignment of spaced shafts. Since the projector and target are small and compact, they may be used in very cramped areas, particularly when the power supply for the light source, such as a flashlight, may be electrically connected thereto by electrical leads and is not an integral part of the projector. Another advantage is its insensibility to shock and vibration as evidenced by the fact that a tested embodiment withstood a 70 G shock without damage or requiring readjustment. While the reticle in the illustrated embodiment is shown not only on the axis of the optical projection system but also in axial alignment with the shaft on which the projector is mounted, it may be preferable, such as in building a projector for use in smaller spacing of shafts, to house the reticle in a manner out of alignment with the shaft and project its image into such alignment.

While certain preferred embodiments of the invention have been specifically disclosed, it is understood that the invention is not limited thereto as many variations will be readily apparent to those skilled in the art and the invention is to be given its broadest possible interpretation within the terms of the following claims:

We claim:

1. Means for projecting a shadow dot in a light surround for identifying the axial extension of an elongated member, said means comprising projecting means for converging a ring of light on said member and diverging said ring out into space, said ring having shadows imposed thereon by said member, an opaque object placed in the path of light, means converging said ring on said object, said shadows imposed on said ring appearing as a shadow dot on said object and in axial alignment with said elongated member.

2. An optical alignment gage including a projector adapted to fit over a shaft, said projector having an elongated reticle therein, projecting means for converging a ring of light in longitudinal alignment with said reticle, said ring of light passing around said reticle from all sides to impose shadows in said ring, optical means for diverging and then reconverging said ring for passage thereof as a converging ring of light from said projector with its axis in axial alignment with said shaft, a target surface on said projector centered within said ring to permit light passage therearound, a target and reflecting surface mounted on a second shaft to receive said converging ring of light with shadows therein from said projector, said reflecting surface reflecting light and shadows back to said projector target surface.

3. An optical alignment gage comprising a projector adapted for attachment over a first shaft and a target adapted for attachment over a second shaft, said projector including a reticle, the longitudinal axis of said reticle being in axial alignment with the axis of a shaft on which said projector is mounted, means generating a converging ring of light onto said reticle, means projecting said ring of light and shadows cast therein by said reticle onto said target, said shadows appearing as a shadow dot on said target in axial alignment with said first shaft.

4. An optical alignment gage comprising a projector having a reticle therein, means for mounting said projector on a shaft with the longitudinal axis of said reticle in axial alignment therewith, means for converging a ring of light onto said reticle, means for projecting into space said light ring and shadows imposed therein by said reticle, said shadows being projected with said ring of light and appearing as a shadow dot in axial alignment with said reticle when said ring is projected onto an opaque object.

5. Means for projecting a shadow dot in a light surround onto an object comprising an elongated reticle, means for generating and converging a ring of light onto said reticle, said reticle having its longitudinal axis in axial alignment with said ring, rays from said ring of light diverging after passing said reticle and having reticle shadows therein, means in the path of said diverging rays for converging said rays onto said object, rays in each longitudinal plane of the ring projecting an elongated reticle shadow onto said object to form a multiple of intersecting elongated shadows, said rays in each plane obscuring non-intersecting portions of shadows in other planes resulting in a shadow dot at the intersection of said shadows.

6. An optical alignment gage including a projector, said projector comprising a housing, means for positioning said housing over the end of a shaft, a source of light centrally mounted within said housing with shielding means for confining light from said source into a radial beam in a plane substantially normal to the axis of said shaft, an elongated reticle mounted in said housing with its longitudinal axis in axial alignment with the axis of said shaft, annular reflecting means in the plane of said radial beam for converging a ring of light onto and around said reticle and diverging said ring of light outwardly therefrom, a window in said projector having a target area centrally mounted therein, means in the path of said ring of light diverging outwardly for projecting said ring through said window around said target area in a converging manner, a target adapted to be mounted on the face of an object spaced from said projector and generally in the path of light projected from said window and a reflecting surface for said target for reflecting light received thereby back to said target area on said window.

7. An optical alignment gage including a projector, said projector comprising a housing, means on one end of said housing for centrally mounting said housing over the end of a first shaft, means forwardly of said mounting means for mounting a source of light in axial alignment with said shaft, an angularly adjustable annular mirrored surface mounted around and somewhat rearwardly of said light source, a truncated conical mirrored surface mounted around said light source and in planar alignment therewith normal to the axis of said shaft, means for mounting a focusing lens forwardly of said light source, a window in the front of said housing, means for mounting a rearwardly reflecting surface in the center of said window and a light receiving surface outwardly over said rearwardly reflecting surface, an aperture extending through the center of said lens, a shield and reticle holder in said aperture, an elongated member serving as a reticle connected between said reticle holder and the center of said rearwardly reflecting surface, spring means for resiliently retaining said reticle in taut condition, means for radially adjusting said lens and said window to align said reticle with the axis of said shaft, said gage also including a light receiving target on a second shaft to be aligned with said first shaft, means for mounting said target normal to the axis of said second shaft, and a mirrored surface positionable over said target to reflect light received thereon back to said light receiving surface.

References Cited in the file of this patent

UNITED STATES PATENTS

| | | |
|---|---|---|
| 1,202,223 | Redfield | Oct. 24, 1916 |
| 2,186,200 | McClain | Jan. 9, 1940 |

OTHER REFERENCES

"Light Rays Can Be Tools," Fultz, Instruments, vol. 22, November 1949, pages 1050–1054.